United States Patent [19]
Hendry et al.

[11] Patent Number: 5,682,529
[45] Date of Patent: Oct. 28, 1997

[54] SYSTEM FOR DYNAMICALLY ACCOMMODATING CHANGES IN DISPLAY CONFIGURATION BY NOTIFYING CHANGES TO CURRENTLY RUNNING APPLICATION PROGRAMS TO GENERATE INFORMATION BY APPLICATION PROGRAMS TO CONFORM TO CHANGED CONFIGURATION

[75] Inventors: Ian Hendry, San Jose; Michael Puckett, Cupertino, both of Calif.

[73] Assignee: Apple Computer, Inc., Cupertino, Calif.

[21] Appl. No.: 209,275

[22] Filed: Mar. 14, 1994

[51] Int. Cl.⁶ .......................... G06F 15/00; G06F 15/72
[52] U.S. Cl. .................. 395/653; 395/828; 395/342; 395/836; 395/682
[58] Field of Search .......................... 395/275, 164, 395/828, 837, 283, 284, 162, 653, 342, 836, 165, 682

[56] References Cited

U.S. PATENT DOCUMENTS

| | | | |
|---|---|---|---|
| 4,377,000 | 3/1983 | Staab | 371/11 |
| 4,862,355 | 8/1989 | Newman et al. | 364/200 |
| 4,897,799 | 1/1990 | Le Gall et al. | 364/514 |
| 5,014,193 | 5/1991 | Garner et al. | 364/200 |
| 5,027,110 | 6/1991 | Chang et al. | 340/731 |
| 5,276,630 | 1/1994 | Baldwin et al. | 364/505 |
| 5,282,268 | 1/1994 | Mieras et al. | 395/164 |
| 5,386,567 | 1/1995 | Lien et al. | 395/700 |
| 5,408,618 | 4/1995 | Aho et al. | 395/325 |
| 5,471,675 | 11/1995 | Zias | 395/162 |

FOREIGN PATENT DOCUMENTS

| | | |
|---|---|---|
| 0295689A3 | 3/1991 | European Pat. Off. |
| 0295690A3 | 3/1991 | European Pat. Off. |
| 3303439A | 8/1984 | Germany |
| 4130921 | 5/1992 | Japan |
| 5165868 | 10/1993 | Japan |

*Primary Examiner*—Lance Leonard Barry
*Assistant Examiner*—Rehana Perveen Krick
*Attorney, Agent, or Firm*—Burns, Doane, Swecker & Mathis

[57] ABSTRACT

A display management architecture detects changes in a display environment and notifies software programs, such as the operating system and applications programs, of the changes to enable them to adjust accordingly. The display management system comprises one part of the computer's operating system, and includes a display manager that provides communication channels between the operating system, other software programs, display drivers and video drivers. The display manager receives information from the drivers regarding the display capabilities of associated display devices, and provides reconfiguration services to other software within the computer. When a change in the display environment occurs, the display manager notifies the software programs of the changes, to enable them to dynamically update or reconfigure the displayed information accordingly. If a program is not able to respond to such a notification, the display manager repositions displayed objects in accordance with the new display environment. All of these actions take place in a real-time fashion while the computer is running, and avoid the need to restart the computer before any changes can take effect.

35 Claims, 6 Drawing Sheets

SYSTEM FOR DYNAMICALLY ACCOMMODATING CHANGES IN DISPLAY CONFIGURATION BY NOTIFYING CHANGES TO CURRENTLY RUNNING APPLICATION PROGRAMS TO GENERATE INFORMATION BY APPLICATION PROGRAMS TO CONFORM TO CHANGED CONFIGURATION

FIELD OF THE INVENTION

The present invention is directed to computer display architecture, and more particularly to a system for controlling the display of information to dynamically accommodate changes in the configuration of a computer system.

BACKGROUND OF THE INVENTION

As computers become more prevalent, particularly personal type computers, users are employing them in a variety of situations. Depending upon the particular situation, the user may change the configuration of one or more display devices connected to the computer. For example, portable computers of the so-called laptop or notebook type have become increasingly popular because of their small size and light weight, making them suitable for use while travelling. Due to the need to keep their dimensions to a minimum, the display screens built into such computers are relatively small in size, and may offer only limited display capabilities. Therefore, when using one of these types of computers in an office environment, the user may connect it to a monitor having a larger display area and enhanced display capabilities. Such a connection might be made, for example, by means of a docking station which enables the portable computer to be conveniently connected to a variety of peripheral devices. In this situation, the computer's built-in display screen may not be available and only the external monitor is used.

Subsequently, the user might remove the computer from the docking station, for example to take it home or use it while travelling. In this situation, the external monitor is no longer present and the built-in display screen must be used. In other words, the computer must route all information to be displayed to the built-in screen, rather than the port to which the external monitor was connected. In addition, the displayed information must be reformatted, or otherwise processed, to accommodate the display parameters of the built-in device.

Further in this regard, the user might establish different preferences for various situations. For example, in the office the user may have one type of external monitor that is located at a certain position relative to the built-in screen of the portable computer. At home, a different type of external monitor may be used, and it might be located at a different position relative to the placement of the portable computer. Each of these situations represents a different display environment. If a consistent display of information is to be provided to the user in each of these environments, the computer must reconfigure the displayed information in accordance with the user's preferences for the particular environment.

As another example of changing display environments, a number of monitors are capable of accepting a wide range of display resolutions. Examples of such monitors include those which have multiple synchronization capabilities. With these types of monitors, the user is provided with the ability to reconfigure the monitor by changing its display mode. In other situations, the physical size or resolution of the display might be changed, which can result in a need to scale the parameters of displayed objects accordingly.

In general, there are a number of different scenarios which result in a change of the display environment. Examples of such are the addition or removal of a monitor or other type of display device, movement of one or more monitors in a multiple-monitor environment to change their positions relative to one another, changing the size and/or resolution of a display device, changing the origin of a global coordinate space within which the displays are defined, and mirroring, in which two or more display devices are caused to have the same information displayed on them. Each time any of these types of changes occurs, the software programs running on the computer must be notified, so that they are able to implement a corresponding change in the manner in which they display objects and other information.

In the past, changes in configuration of the display device, and the need to accommodate therefore, were only detected upon startup of the computer. If a change in display configuration occurred while the computer was running, it would not become effective until the user restarted the computer. While in some situations the user might turn off the computer before changing display configurations, for example when adding a monitor, this is not always the case. In particular, many portable computers offer a "sleep" mode of operation, to conserve battery power. In this mode, the computer's central processing unit is maintained in a minimal operating state to keep software programs running in memory, but other power consuming devices such as displays and disk drives are turned off. It is not uncommon that a user might place a portable computer in the sleep mode before removing it from a docking station, for example. In such a case, when the computer is reactivated after being removed from the docking station, it will not be aware of the changed display configuration and therefore may not function properly. In particular, display devices that were being controlled by various programs may no longer be present. As a result, the user is forced to undergo the time-consuming inconvenience of having to restart the computer and relaunch the programs that were running, in order to apprise the programs of the new configuration.

SUMMARY OF THE INVENTION

It is desirable, therefore, to provide a display system in which changes in display configuration can be dynamically accommodated while a computer is running, and thereby forego the need to restart the computer and relaunch programs before a configuration change can take effect. In accordance with the present invention, this objective is achieved by means of a display management architecture that detects changes in display configuration and notifies software programs, such as the operating system and applications programs, of the changes to enable them to adjust accordingly.

The display management architecture of the present invention includes a display manager that comprises one part of the computer's operating system. This display manager provides communication channels between the operating system, other software programs, display drivers and video drivers. The display manager continually receives information from the drivers regarding the display capabilities of associated display devices, and provides reconfiguration services to other software within the computer. When a change in the display environment occurs, the display manager notifies the software programs of the changes, to enable them to dynamically update or reconfigure the displayed information accordingly. If a program is not able to respond to such a notification, the display manager repositions displayed objects in accordance with the new display environment. All of these actions take place in a real-time fashion while the computer is running, and avoid the need to restart the computer before any changes can take effect.

Further features and advantages of the invention are explained in detail hereinafter with reference to specific embodiments described with reference to the accompanying drawings.

DETAILED DESCRIPTION

Figure 1:
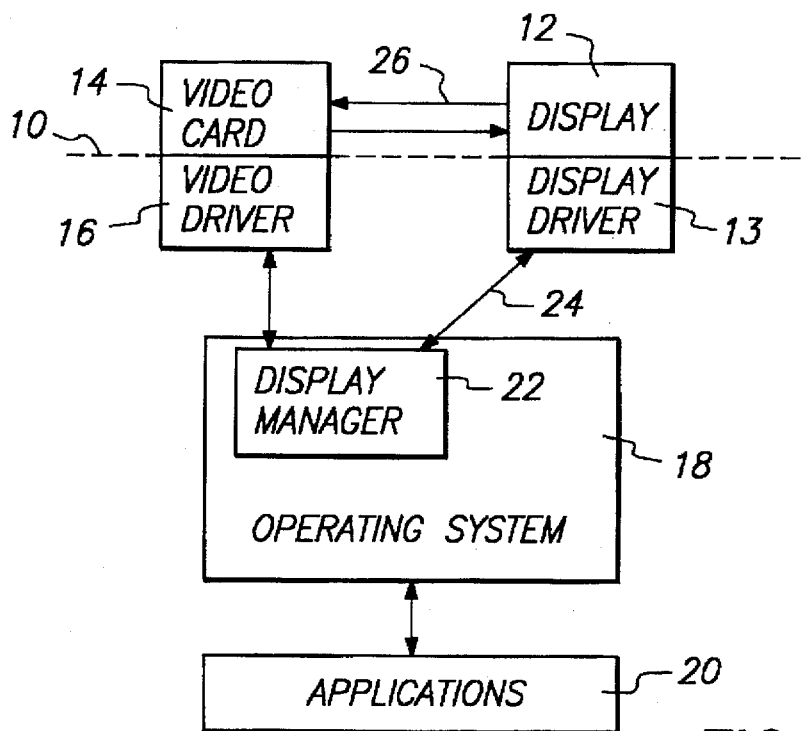
FIG. 1 is a block diagram of an overall display system architecture in accordance with the present invention.

The present invention is directed to an architecture for determining display capabilities within a computer system and dynamically configuring display devices in accordance with those capabilities. A block diagram of the overall architecture is illustrated in FIG. 1. Referring thereto, hardware components of the computer system are illustrated above a dashed line 10, and software components below the line. The system can include one or more display devices 12, e.g. monitors or LCD screens, although actual display devices need not be present in order for the present invention to operate properly. Each display device is connected to, and controlled by, a video card 14 which operates in accordance with video driver software 16. Although depicted as being on a separate card, or printed circuit board, the components of the video card could be incorporated with other components on a single card, such as a motherboard for the computer.

One or more software programs, such as application programs 20, generate information to be displayed on the display devices. Examples of such information include text, windows and other graphical objects, and command structures such as menus and dialog boxes. This information is presented to the display device through the computer's operating system 18, which also generates its own information to be presented on the display. More particularly, the operating system communicates with the display device through an associated display driver 13, which is a software component that corresponds to the hardware of the display device 12.

In accordance with the present invention, the operating system includes a display manager 22 which provides communication between each of the software components, to dynamically configure the display devices 12. The communication between the various software components and the hardware devices takes place via their associated drivers, e.g. the video driver and the display driver. In this regard, many video displays have the capability to provide information regarding their available modes of operation and/or timing specifications. Some displays, so-called "smart displays", are capable of providing information about their modes of operation directly, for example in response to inquiries. For these types of displays, the display manager 22 communicates with the display device, by means of the display driver 13, over a communication channel 24. This communication channel could be a bus within the computer, a serial line, or any other suitable path for exchanging information between the display manager and the display driver 13 of the display device.

In some cases the display device may not be able to communicate its capabilities directly. However, through the use of a look-up table or the like, the display driver 13 can obtain information regarding the display's capabilities and provide them to the display manager.

Other types of display devices provide timing information by means of a sense code transmitted over a line 26 connected between the device and the video card 14. In essence, the sense code is determined by certain pins which are grounded or connected to one another in the device, to indicate its specifications. This sense code is passed on to the display manager 22 from the video card 14. In response to the information received about the display's specification and capabilities, the display manager issues a command to the video card, through the video driver software 16, to drive the display device accordingly.

The display manager also communicates with other parts of the operating system 18 and the other software programs 20 that are running on the computer. For example, in response to operator commands, the operating system can instruct the display manager to add a new device to a list of active displays, or remove a device therefrom. In response thereto, the display manager informs the application programs 20 of the new display configurations, to enable them to update their displayed information accordingly.

The display manager can accommodate a variety of different changes to the display environment, and dynamically reconfigures the system accordingly. The types of changes that can occur in the display environment are explained with reference to FIGS. 2A–2D. Generally speaking, the display environment can be considered to be defined by a global coordinate space 30. Objects and other information to be displayed can be positioned anywhere within this space, as determined by the user and/or the software program that generates the information. A reference point in this space, e.g. its origin or 0,0 coordinate point, is usually established with reference to some object that is always present in the display. For instance, most graphical user interfaces include some type of menu bar or other structure which enables the user to access basic commands to control the computer. The device which displays this menu bar is known as the main device. If the computer system contains multiple display devices, only one of the devices is designated as the main device, even if multiple devices contain the menu bar.

Figure 2A:
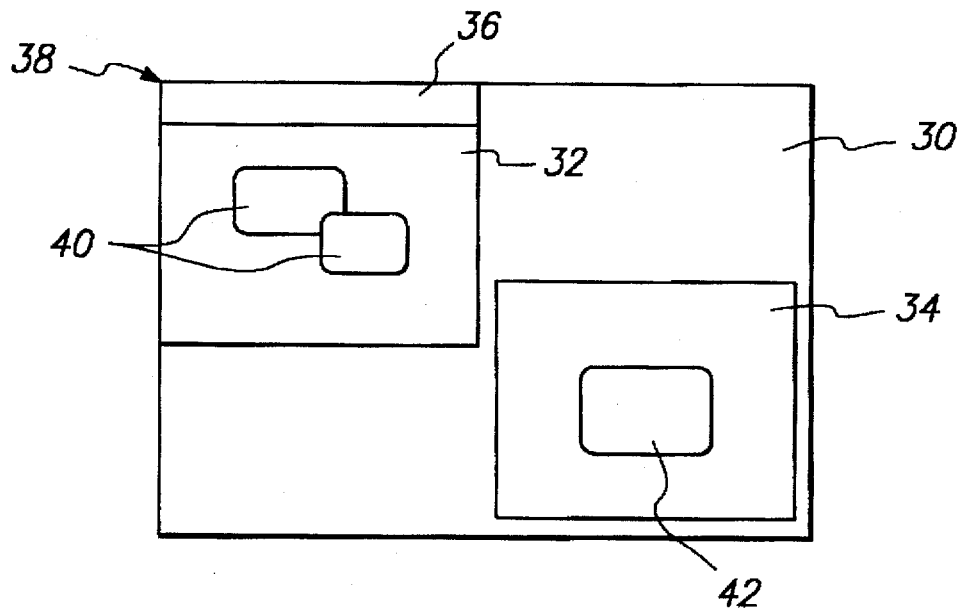
FIGS. 2A–2D illustrate examples of changes in a display environment.

The origin of the coordinate display space is typically established with reference to the menu bar. For example, as shown in FIG. 2A, the 0,0 point 38 in the coordinate space can coincide with the top left corner of a menu bar 36. The positions of all objects and other information to be displayed in the display space 30 are defined by their coordinates within this space. The operating system receives this coordinate information, for example from the software programs 20 which generate the information, and provides it to the display driver to cause the information to appear at the appropriate place on the screen of the display device located at the corresponding position in the display space.

Referring to FIG. 2A, for example, the display environment consists of two display devices, 32 and 34, within the global display space 30. A menu bar 36 is displayed at the top of the screen for the device 32, which is therefore the main device. Accordingly, the origin 38 of the display space coincides with the top left corner of the device 32. As illustrated in FIG. 2A, the user has caused some objects, e.g. windows 40, to be displayed on the device 32, and another object 42 to be displayed on the device 34.

Figure 2B:
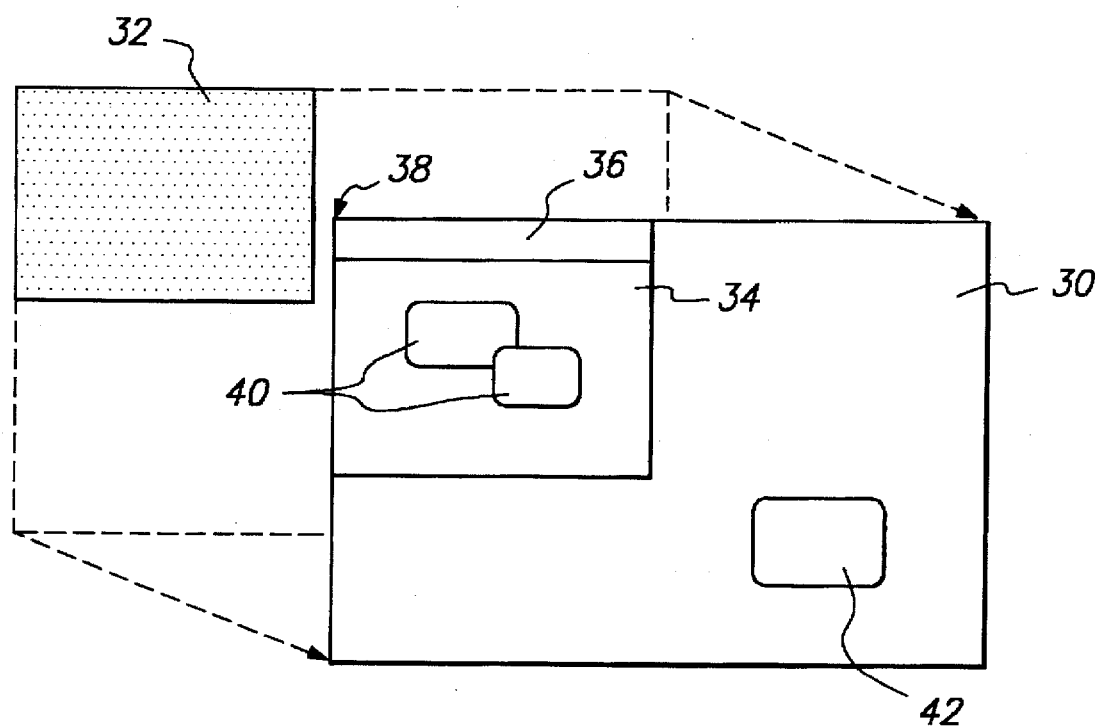

FIG. 2B represents the situation in which the device 32 has been removed from the computer's configuration, as depicted by the shaded area. In this case, the device 34 becomes the main device, since it is the only remaining device. Accordingly, the origin 38 of the display space 30 shifts to coincide with the top left corner of this device, as indicated by the dashed lines and arrows. The information that is presented to the display driver for this device must be revised so that the menu bar is displayed thereon. Because of this shift, the object 42 has moved off screen, since its location in the display space is no longer occupied by an existing device. Accordingly, the program which generated this object must be properly informed, so that the object can be repositioned within the space 30 to appear on an available screen.

Figure 2C:
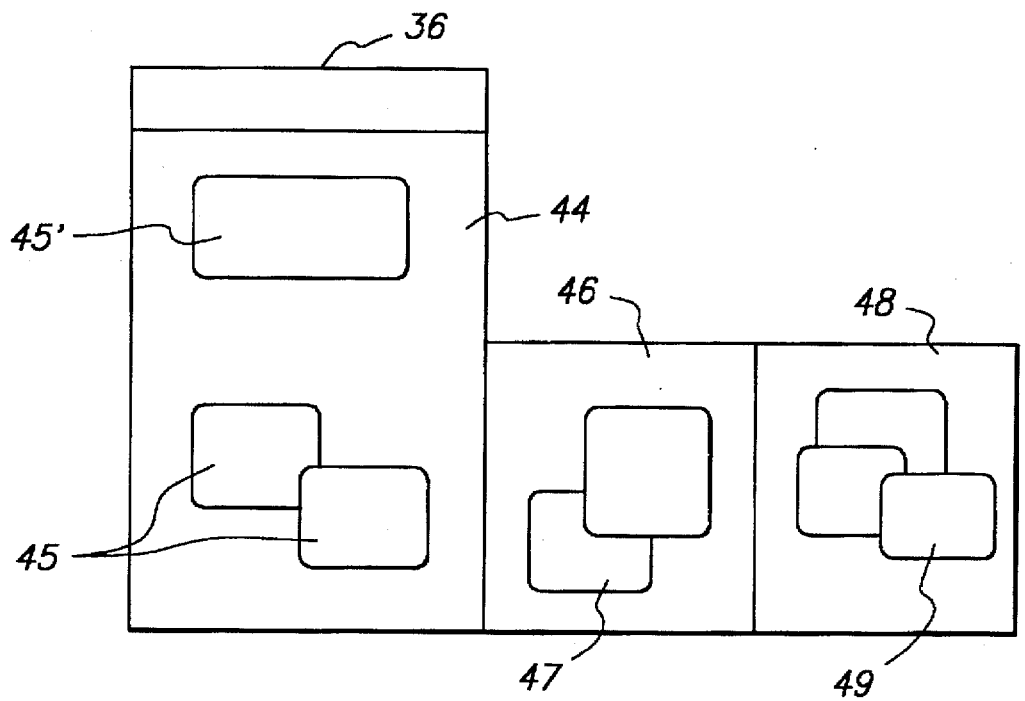
Figure 2D:
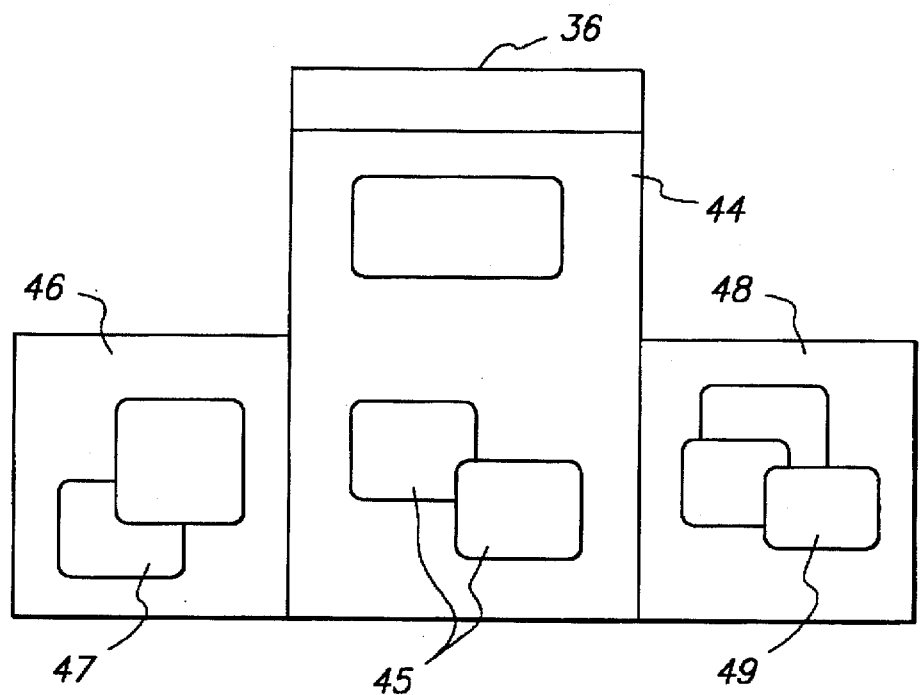

Another type of change in the display environment is depicted in FIGS. 2C and 2D. In the example of FIG. 2C, the display environment consists of three monitors, a full-page monitor 44 and two half-page monitors 46 and 48, each having various objects 45, 45', 47 and 49 displayed thereon. The full-page monitor 44 is the main device, and has the menu bar 36 displayed thereon. If the user repositions the monitors relative to one another, for example by switching the monitors 44 and 46, the relative arrangement of the displayed objects will be altered within the global display space 30, as shown in FIG. 2D. For example, the menu bar 36 is displayed on the central monitor, rather than the leftmost monitor as in the previous configuration. To return the menu bar to the leftmost monitor, the device 46 will have to become the main device.

Other types of changes in the display environment can include (i) a change in the size and/or aspect ratio of the display devices, (ii) movement of the menu bar 36 from one display device to another, resulting in a shift of the origin for the global display space relative to the devices, and (iii) a change in resolution of a display device necessitating a scaling of the sizes of objects displayed on that device.

In the system of the present invention, the display manager responds to a change in the display environment by informing the operating system 18 of the change while the computer is still running. Similarly, the display manager informs the applications programs 20 and other appropriate software programs of the change in display configuration, so that they can dynamically adjust the displayed information in accordance with the new configuration.

Figure 3:
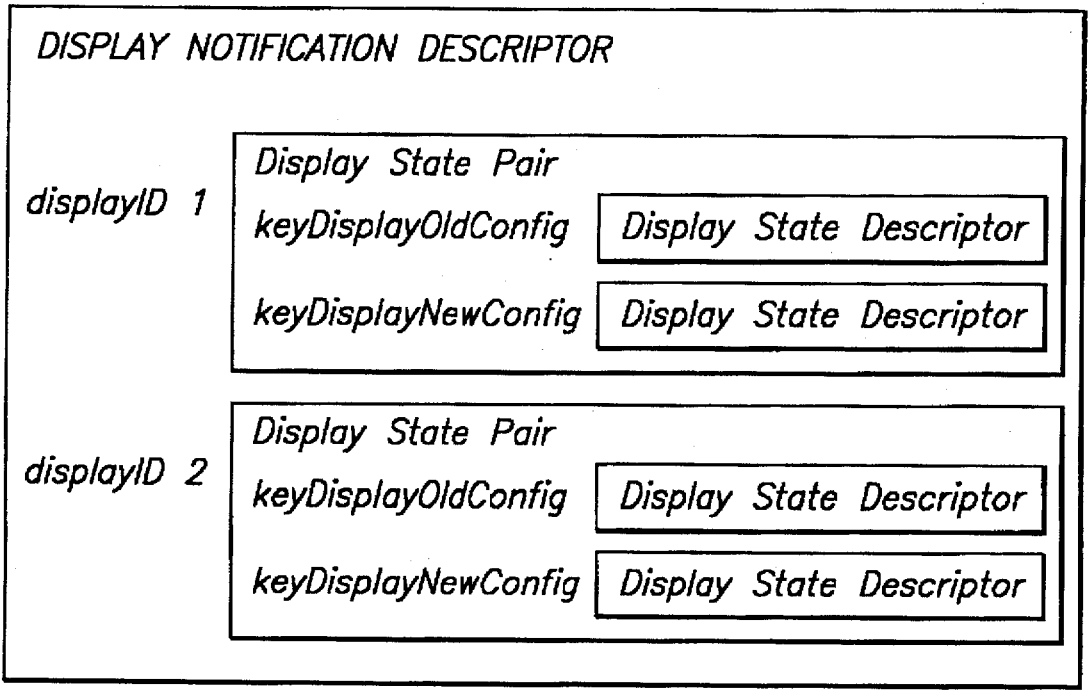
FIG. 3 is a block diagram of the structure of a display change notification provided by the display manager.

The information that is provided to the operating system and other software programs by the display manager, in response to a change in configuration, comprises a list of pairs of display state descriptors. An example of a structure for a display notification is illustrated in FIG. 3. Referring thereto, the display manager sends a pair of display state descriptors for each display device. Each pair comprise an old state descriptor and a new state descriptor. If a display device is added to the system, the old state descriptor has a null value and the new state descriptor contains information describing the characteristics and operating parameters of the display device. Such information might include, for example, the size of the display area, pixel size, operating mode, and its position within the global display space. If a display device is removed, the new descriptor is a null value.

This notification is provided by the display manager whenever a change in display configuration is detected. Such a change might occur as a result of a user action, for example, where a user explicitly issues commands to add, remove or change operating modes of display devices. Alternatively, it may occur automatically as a result of detecting the connection or disconnection of a device from the computer, for example upon insertion into or removal from a docking station, or the pivoting of a monitor from a portrait position to a landscape position.

In response to the notification of the old and new states, each software program receiving such notice updates its displayed information while it is running. For example, the program might resize or reposition windows so that they fit within the display area.

In order to successfully respond to a notification identifying a change in display configuration, a software program may need to have certain functionality which enables it to receive and process the information in the notification. It may be the case, however, that some programs will not possess this functionality. In such a case, the display manager ensures compatibility of these programs with the change in display configuration.

Such compatibility is achieved by ensuring that all displayed objects that were displayed in the old configuration, such as windows and other objects in a graphical user interface, are also displayed in the new configuration. When a call is made to the display manager to change the display configuration, the display manager first stores the current state of the display. With reference to FIG. 2A, for example, the display manager stores the position of each of the devices 32 and 34 within the global display space 30, as well as the position of the menu bar 36 and other information of interest. Thereafter, the display manager rearranges the display space. Once the new configuration has been established, as shown in FIG. 2B, the display manager determines whether any objects which were previously on-screen are now off-screen, such as the object 42. In response to such a determination, the display manager causes the object to be repositioned on-screen. This can be done by means of a command to the software program which generated the object.

In determining where to position an object that has been left off-screen, the display manager can choose from among a number of alternatives. For example, if the device on which the object was displayed in the old configuration still exists in the new environment, the object can be moved so that it is located in the same position on the screen of that device. Alternatively, the display manager can determine the closest available device to the off-screen object, and move the object so that it appears on that device.

Figure 4A:
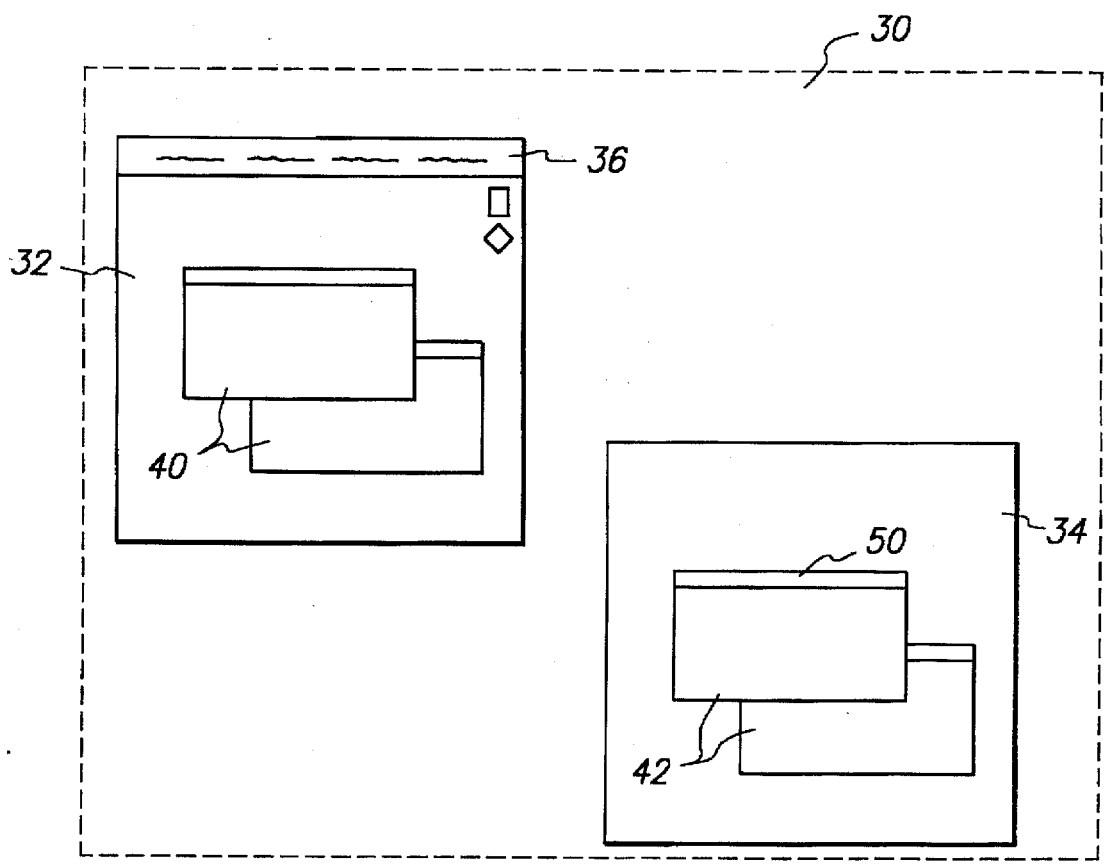
FIGS. 4A and 4B illustrate examples of display configurations before and after a display device is removed from the computer system.

In carrying out this function, it is not necessary that the objects be displayed in the new configuration in precisely the same manner as they were in the old configuration. For example, the old configuration may comprise two display devices, as shown in FIG. 4A. A menu bar 36 is displayed on the main device 32, and various windows 40, 42 appear on each of the two screens for the display devices.

Figure 4B:
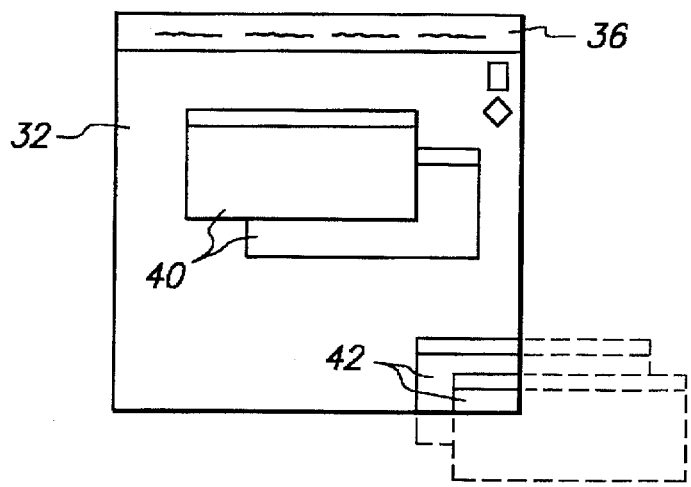

In the new configuration, shown in FIG. 4B, the display device 34 has been removed. In this case, it is necessary to move its displayed objects, namely the windows 42, to the remaining device 32. For small objects, it may be appropriate to move them in their entirety to the screen of the remaining device. They can be placed in a suitable default location, for example along the right edge of the display under any existing objects. For larger objects, such as windows, however, the display may become too cluttered if an attempt is made to place them entirely within its area. In this regard, it is not necessary to display an entire window to provide the user with access to the window's functionality. Rather, the user only needs access to a limited portion of the window in order to control it. For most windows, this critical portion is a title bar 50, which typically resides along one edge of the window, normally the top. As long as the user can "grab" the title bar, for example with a cursor, he is able to position the window at any location within the display area, to view its contents and control its functions.

Therefore, when repositioning objects which would otherwise end up off the screen due to the removal or repositioning of a display device, only the critical portion of each object, i.e. that portion whose access enables the user to control the object's function, is displayed within the new configuration. This aspect of the invention is illustrated in FIG. 4B, where only a portion of the title bar for each of the windows 42 is displayed on the screen of the remaining display device 32.

If the main device is removed from the display environment, the display manager moves the menu bar 30 to a remaining display device, which becomes the main device, as shown in the example of FIGS. 2A and 2B. In the event that the size of the main device in the new configuration is different from that of the old configuration, the display manager calculates a new size for each application's menu bar, and moves the window or other data structure containing the menu bar onto the new main device. To accomplish this function, the display manager switches into the displayed content of each application, and examines the menu bar. The menu bar is then redrawn, e.g. scaled, to fit into the new display space.

In operation, some applications and other programs may cache a reference to the main device object, i.e. obtain the address of the main device object one time and store that address for future use. If a new device becomes the main device in this type of situation, these types of programs will attempt to direct display information to a device that may no longer exist. To avoid such a dilemma when another device becomes the main device, it is preferable to exchange the contents of the two objects for the former and current main devices, so that references to the main device object continue to properly refer to the current main device. With this approach, the cached reference to the main device object remains valid, even though its contents have been changed to identify the new main device.

In the course of changing display configurations, it may be the case that the last display device is removed. This situation can occur, for example, after one monitor has been unplugged and before a new monitor is plugged in. In another situation, the user might close the lid on a portable computer, thereby effectively removing the built-in display from the display environment. In a preferred implementation of the invention, the display manager can detect the removal of a device from the display environment. For example, as the lid of a portable computer is closed or a monitor cable is disconnected, a switch can provide a signal to the display manager. In response thereto, the display manager deactivates the display by removing it from the active device list, and dynamically reconfigures the environment accordingly.

In either of these cases, if the removed device was the only display device connected to the computer, there is no physical device which can serve as the main device. In such a situation, the display manager installs a virtual device and establishes it as the main device. This operation is depicted in FIGS. 5A–5G. In each of these figures, the left side illustrates two device lists, an active list and a removed list, and the right side of the figure depicts the displays which are on the active list. In the device list, a particular memory location is depicted by a block 52, and the contents of that location are represented by a letter within the block.

Figure 5A:
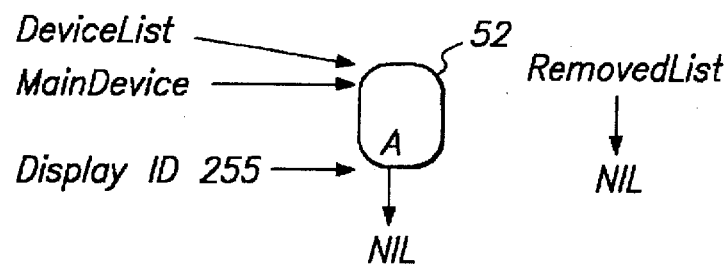
FIGS. 5A–5G illustrate the process of replacing one display device with another, in which a virtual device is used in the interim.
Figure 5B:
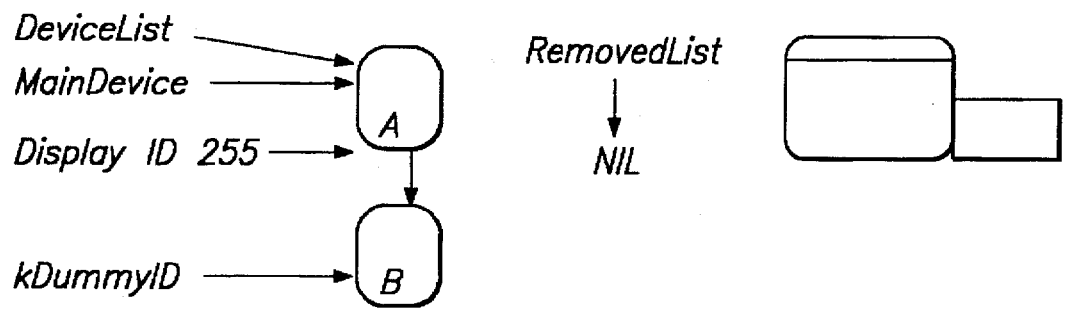
Figure 5C:
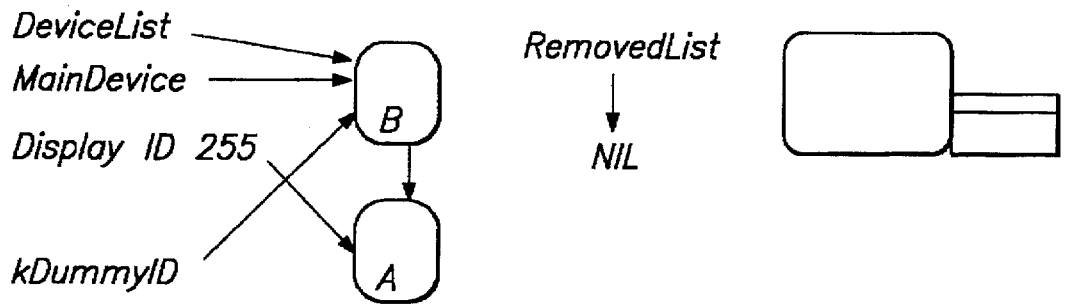
Figure 5D:
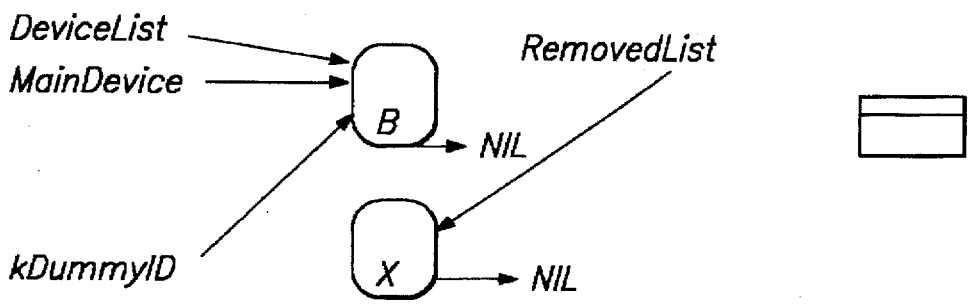

FIG. 5A depicts the situation that exists before the change in configuration. The device list contains one item, i.e. the identification of the current main device, and the removed list is empty. When the last remaining device is disabled, a dummy or virtual device is created and added to the device list, as shown in FIG. 5B. This procedure ensures that there is always one active device to which display-related information can be directed. Once the virtual device has been created, the display manager completes the process of disabling the real device. As shown in FIG. 5C, this process includes the steps of swapping the contents of the device handles or objects. Namely, the identification of the former main device is switched with that of the new device which, in this case, is the virtual device. As a result the display identifications point to different display devices, and the main device reference continues to point to the current main device, which is now the virtual device. As explained previously, this feature allows programs that cache the main device to continue to work properly. More particularly, any program's stored reference to the main device object is still pointing to the current main device. After the contents of the device handles have been swapped, the device corresponding to the former main display is removed from the device list and placed in the removed list, as shown in FIG. 5D.

Figure 5E:
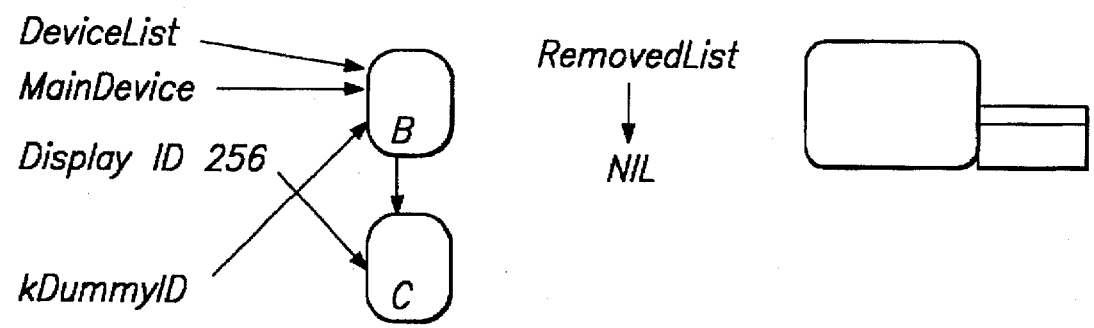
Figure 5F:
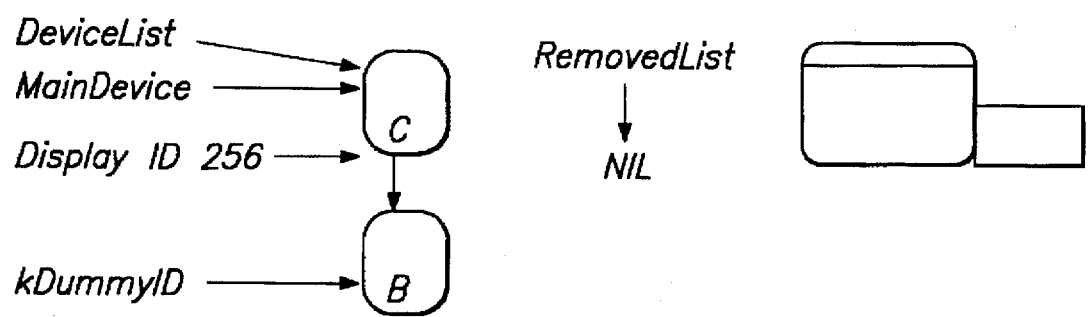
Figure 5G:
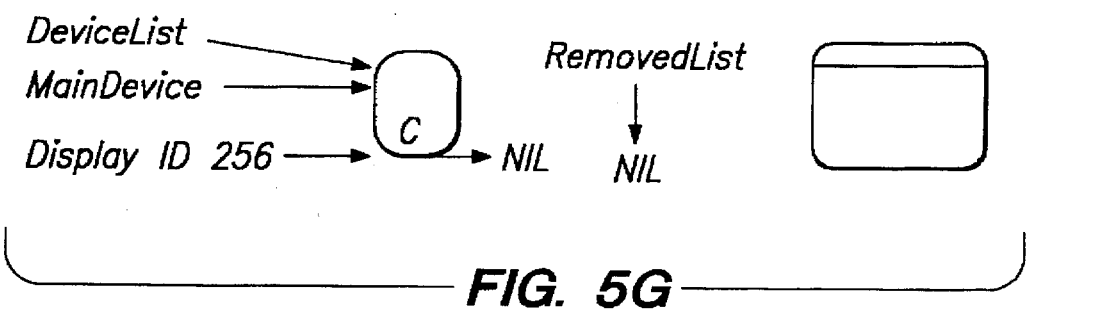

Subsequently, a new real display is added to the configuration. This situation is depicted in FIG. 5E. At this point, the virtual device is still present, to ensure that at least one active display is present at all times. Once the real display has been enabled, for example in response to a user action, the display manager swaps the identifications of the new display device and the virtual display device, as shown in FIG. 5F. This causes the menu bar to be moved to the new, real display. Thereafter, the virtual display is disabled by removing it from the display list, leaving only the new main display, as shown in FIG. 5G.

If a user has multiple display configurations which are regularly employed, the display manager can store information about each and use this information to automatically configure the environment as appropriate. For example, a user might have one display configuration that is employed at the office, and a different one at home. The display manager can store user preferences for each of these configurations, such as the locations of the displays and their bit depths, as well as the designated main display device. Based on sensed hardware configurations and/or environmental indicators, such as network identifiers or user-specified location, the display manager can automatically retrieve the information pertaining to that environment and configure the display devices accordingly.

Other features are also available with the display manager. For example, it can provide mirroring of two or more display devices. When two display devices are mirrored to one another, they both display the same information. With the architecture of the present invention, where all display devices communicate with the display manager, the same information can be sent to any two or more such devices via the display manager, to provide the mirroring function. This can be done, for example, by resizing the two devices to be the same size, and laying one on top of the other in the global display space. Alternatively, if frame buffers are employed to store the displayed information, two or more devices can be directed to share the same frame buffer.

As another feature, the display manager can provide management of displays in accordance with interdependent factors. For example, some displays having certain timing specifications may only provide certain bit-depth capabilities, i.e. they may have a limited number of available colors. Whenever a display of this type is added to the environment, the display manager can select the most appropriate operating mode or bit depth and communicate that information to the video driver and/or the device driver. In another instance, two or more devices may share a common frame buffer. If the operating mode of one of the devices is changed, it may have an impact on the operation of the other device, for example in terms of the mount of memory available to that other device. In response thereto, the display manager can alter the operating mode of the other device to be commensurate with the changed conditions.

The display manager can also be used to control specific hardware-oriented features of a display through a software interface. For example, the user can employ the display manager to adjust the geometry of a display, the position of the image or other features typically found on a display device, such as brightness and contrast.

From the foregoing, it can be seen that the present invention provides a hardware-independent communication channel between all of the components of a computer that participate in the display of information, namely the display drivers, video drivers, operating system software and applications programs. This architecture provides a mechanism by which the displayed information can be dynamically updated to accommodate changes in the configuration of the display, without requiring a restart of the computer.

It will be appreciated by those of ordinary skill in the art that the present invention can be embodied in various forms without departing from the spirit or essential characteristics thereof. The foregoing description is intended to be illustrative rather than restrictive. The scope of the invention is defined by the following claims, rather than the foregoing description, and all changes within the meaning and range of equivalents thereof are intended to be embraced therein.

What is claimed is:

1. In a computer, a system for controlling the display of information generated by application programs running on the computer, comprising:
    means for determining the configuration of a display environment for the computer;
    means for detecting a change in said configuration and, in response thereto, for determining differences between the original configuration and the changed configuration;
    means responsive to said differences for identifying information whose display is affected by said differences; and
    means for communicating the changed configuration to said application programs while said programs are running on the computer, to cause information generated by said applications programs which are affected by said differences to be displayed in the changed configuration without requiring a restart of the computer.

2. The system of claim 1 wherein the communication to the application programs includes identification of the original configuration and the changed configuration.

3. The system of claim 1 wherein said identifying means determines whether information displayed in the original configuration will be displayed in the new configuration, and said communication means communicates the changed configuration to application programs whose displayed information is affected by said differences, to cause said application programs to reposition information to ensure that it will be displayed in the new configuration.

4. The system of claim 3 wherein said identifying means determines the position of information in a display space relative to the location of a display device, and said application programs reposition information within said display space so that it coincides with the location of a display device.

5. A method for controlling the display of information in a computer system, comprising the steps of:
    generating a request to change the display environment for the computer system;
    storing the current state of displayed information;
    identifying information that is displayed on a display device in the stored current state;
    determining a new configuration for the display environment;
    determining the location of at least one display device in the new configuration;
    providing information to one or more application programs running on the computer of the change in configuration of the display environment to enable said application programs to adjust displayed information generated by said application programs to conform to the new configuration while said programs are running on the computer system; and
    repositioning displayed information to conform to the new configuration by moving at least some of said identified information to the location of said display device in the new configuration.

6. The method of claim 5 further including the steps of detecting whether any of said identified information is located off-screen with respect to a display device in the new configuration, and moving such information, relative to other displayed information, to position at least a portion of such information on-screen with respect to the display device.

7. The method of claim 6 wherein the moved information includes a critical portion that provides user access to said information and a non-critical portion, and wherein said moving step comprises the step of positioning at least said critical portion within the display area of said display device while leaving at least part of the non-critical portion of the information outside of said display area.

8. The method of claim 5 further including the steps of:
    detecting the absence of any physical display device being active on said computer system;
    creating an identification for a virtual display device and assigning at least some of the displayed information to said virtual device;
    subsequently detecting the activation of a physical display device on said computer system; and
    reassigning said displayed information from the virtual display device to the activated display device.

9. The method of claim 8 wherein the displayed information that is assigned to said virtual display device includes command information that provides control over at least some of the functions of said computer system.

10. The method of claim 9 wherein said command information comprises a menu bar of user-accessible commands.

11. The system of claim 4 wherein said repositioned information contains a critical portion and a non-critical portion, and said information is repositioned such that said critical portion coincides with the location of a display device and at least some of said non-critical portion is outside the location of the display device.

12. The system of claim 1 further including:
means for storing information describing each of a plurality of display configurations;
means for determining that one or more display devices connected to said computer conform to one of said configurations; and
means for providing said communicating means with the stored information pertaining to said one configuration, to thereby cause displayed information to conform to said one configuration.

13. The system of claim 12 wherein said determining means senses hardware configurations of said one or more display devices.

14. The system of claim 12 wherein said determining means is responsive to an environmental indicator to determine whether said one or more display devices conform to one of said configurations.

15. The system of claim 14 wherein said environmental indicator is a network identifier.

16. The system of claim 14 wherein said environmental indicator is a command generated by a user of the computer.

17. A computer system, comprising:
at least one display device for displaying information processed within the computer system; and
an operating system for receiving information generated by application programs running on said computer system and providing said information to said display device for display thereof, said operating system including a display manager which is responsive to changes in configuration of said display device to provide a notification of such changes to application programs running on said computer to cause said information generated by said application programs to conform to the changed configuration.

18. The computer system of claim 17 wherein said configuration changes comprise changes in the physical arrangement of plural display devices.

19. The computer system of claim 17 wherein said display manager defines a global display space, and notifies application programs of physical locations of display devices within said global display space.

20. The computer system of claim 17 wherein said configuration changes comprise the removal of a display device connected to the computer system.

21. The computer system of claim 20 wherein said display manager detects whether a removed display device is the only active display device connected to the computer system, and includes means for creating a virtual display device if the removed display device was the only active display device.

22. The computer system of claim 20 wherein said configuration changes further include the addition of a display device.

23. The computer system of claim 19 wherein said display manager is responsive to the removal of a display device to cause at least some of the information displayed on the removed display device to be displayed on another display device connected to the computer system.

24. The computer system of claim 23 wherein said information that is displayed on another display device includes a critical control element that is necessary for the operation of the computer system.

25. The computer system of claim 24 wherein said critical control element is a menu bar.

26. The computer system of claim 17 wherein said display manager is responsive to the connection of plural displays to the computer system to cause the same information to be displayed on each of said plural displays.

27. The computer system of claim 17 wherein a notification comprises an identification of the original display configuration and the changed display configuration.

28. The computer system of claim 17 wherein said configuration changes comprise changes in the size of a display device.

29. The computer system of claim 17 wherein said configuration changes comprise movement of a displayed control element that is critical to the operation of the computer from one display device to another display device.

30. The computer system of claim 29 wherein said display manager defines a global display space, and determines a reference location in said global display space on the basis of the display device on which said control element is displayed.

31. The computer system of claim 29 wherein said display manager stores an identification of the display device on which said control element is displayed at a predetermined location in a memory, and changes the identification stored at said predetermined location to identify the display device to which the control element is moved, to thereby maintain a constant reference location for the identification of the display device on which said control element is displayed.

32. The computer system of claim 17 wherein said configuration changes comprise changes in the resolution of a display device.

33. The computer system of claim 17 further including a display driver software program that is associated with said display device, for providing information to said display manager regarding the configuration of the display device.

34. The computer system of claim 33 wherein said display driver communicates with said display manager over a path which is independent of a path via which said operating system provides information to be displayed to said display device.

35. The computer system of claim 33 wherein said display driver receives said configuration information directly from said display device.

\* \* \* \* \*